United States Patent Office.

DAVID R. MORGAN, OF SAN FRANCISCO, CALIFORNIA.

Letters Patent No. 73,369, dated January 14, 1868.

IMPROVED EYE-MEDICINE.

The Schedule referred to in these Letters Patent and making part of the same.

TO ALL WHOM IT MAY CONCERN:

Be it known that I, DAVID R. MORGAN, of the city and county of San Francisco, State of California, have invented an improved Eye-Lotion, called "Morgan's Asiatic Eye-Lotion;" and I do hereby declare that the ingredients used, and the process of mixing and compounding them to make the said lotion, are described in the following specification.

My preparation relates to that class of compounds for the radical cure of the disease of the eye incident to the Pacific coast, and known as granules, which consists of pustules or excrescences, of about the size of a grain of wheat, which attach themselves to the inner membrane of the eyelid, which produces great irritation to the eye, and in cases of long standing results in total blindness. To remove these granules, and effect a radical cure of these cases, as well as to provide a lotion and emollient for other classes of sore or diseased eyes, is the object of my invention.

For the preparation of my eye-lotion I use the following ingredients, to wit: One (1) ounce sugar of lead, six (6) ounces sulphate of copper, six (6) ounces sulphate of zinc, six (6) ounces of common alum, and six (6) grains nitrate of silver, to one-half gallon of distilled water. The above ingredients must be added to the water while it is boiling, and after they have dissolved, and the solution is cooled, it is to be filtered, when it is ready for use.

This lotion should be applied to the eye but once a day, by means of a common glass tube, or it may be dropped into it in the usual way. A considerable smarting will be experienced by the patient for some little time, but will soon subside. In some cases where the eye is very tender the above solution may be found to be of too great strength, and may be diluted by the addition of distilled water until it is of the desired strength. The medicine, after application, soon produces a suppuration, and a discharge of the granules, leaving the eye in a short time with a perfectly smooth lid, and as natural as before it was diseased.

As an emollient, to be used alternately once a day with the lotion, I employ a compound, consisting of castile soap, one-half ($\frac{1}{2}$) pound; white crushed sugar, one-half ($\frac{1}{2}$) pound; common salt, one (1) ounce; sweet oil, one (1) ounce; beef's gall, three (3) ounces. The castile soap must be thoroughly dissolved in a quart of water, then the sugar added. After slow boiling fifteen (15) or twenty (20) minutes, then the salt is added, which precipitates the fluid to the bottom of the vessel, leaving the sediment at the top, when the fluid is drawn from the bottom and used as above described.

Having thus described my invention, what I claim, and desire to secure by Letters Patent, is—

The above-described composition for treating the eyes, made of the ingredients enumerated, mixed or compounded in about the proportions specified.

In witness whereof, I have hereunto set my hand and seal.

D. R. MORGAN. [L. S.]

Witnesses:
   J. L. BOONE,
   C. W. M. SMITH.